O. J. MORTENSON.
ASH PAN AND DETACHABLE BAIL THEREFOR.
APPLICATION FILED MAR. 20, 1909. RENEWED MAY 31, 1910.
980,990.
Patented Jan. 10, 1911.
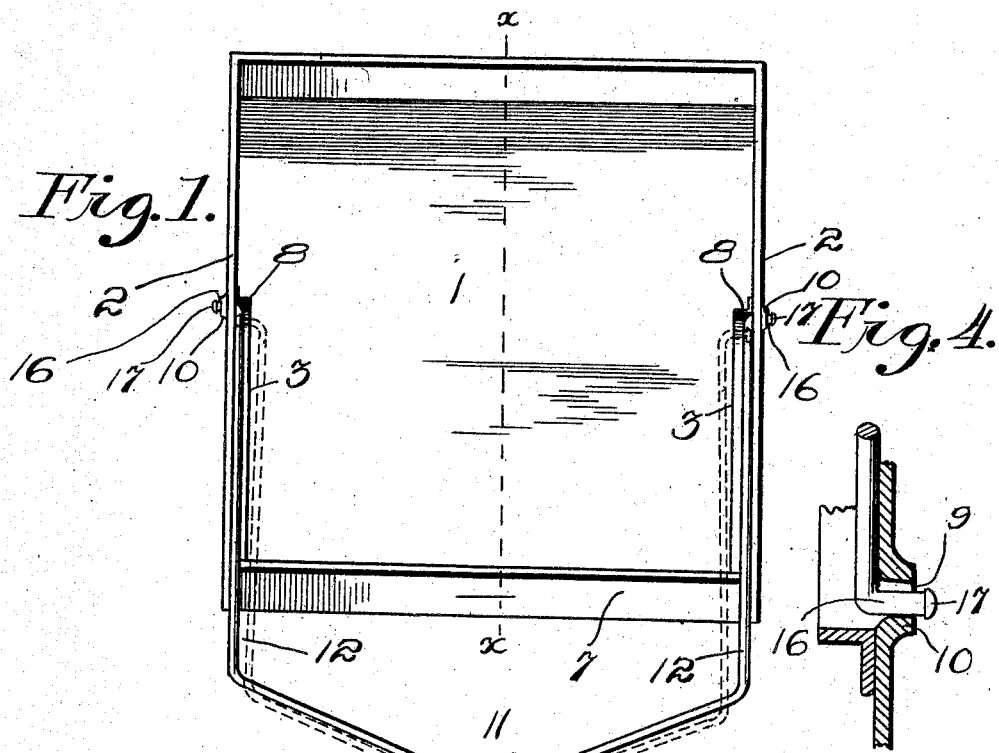
Fig. 1.
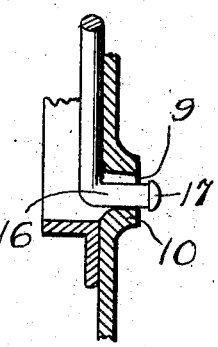
Fig. 4.
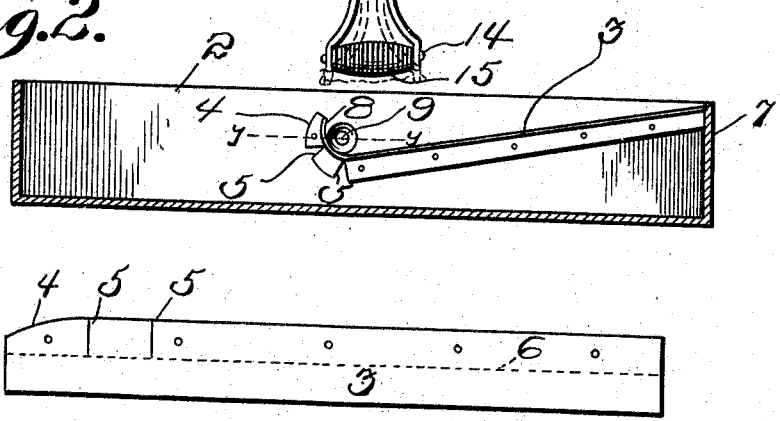
Fig. 2.
Fig. 3.
Witnesses
Inventor
Otto J. Mortenson.
By E. E. Vrooman
his Attorney

UNITED STATES PATENT OFFICE.

OTTO J. MORTENSON, OF WIBAUX, MONTANA.

ASH-PAN AND DETACHABLE BAIL THEREFOR.

980,990.  Specification of Letters Patent.  Patented Jan. 10, 1911.

Application filed March 20, 1909, Serial No. 484,734. Renewed May 31, 1910. Serial No. 564,141.

*To all whom it may concern:*

Be it known that I, OTTO J. MORTENSON, a citizen of the United States, residing at Wibaux, in the county of Dawson and State of Montana, have invented certain new and useful Improvements in Ash-Pans and Detachable Bails Therefor, of which the following is a specification, reference being had therein to the accompanying drawing.

My invention relates to improvements in ash-pans and detachable bails therefor, and has for its object to provide a simple and efficient article, which can be quickly and conveniently removed and replaced in a stove or heater.

Other objects and advantages of my invention will appear in the course of the following specification.

In the accompanying drawings: Figure 1 is a perspective view of my improved ash-pan and bail therefor. Fig. 2 is a section through the ash-pan on the line *x—x* of Fig. 1. Fig. 3 is a side elevation showing one of the guides before the same is bent and secured in position. Fig. 4 is a fragmentary sectional view on the line *y—y* of Fig. 2, showing the lower portion of one of the arms of the bail in position.

Referring to the drawing, which represents the preferred form of my invention, 1 designates the ash-pan, which is substantially rectangular in shape, but which could, of course, be of any desired or conventional form. The inside of the sides 2, 2, of the pan are provided with oppositely arranged guides 3, 3, which are, preferably, in the shape of separate pieces of metal riveted or otherwise secured in position. As shown in Fig. 3, these blanks are stamped out of sheet metal with one corner thereof slightly rounded off, as at 4, and a couple of transverse slits 5, 5, on the same side, which extend about half way across the blank to the longitudinal dotted line 6. The dotted line 6 indicates the point at which the blank is bent at right angles when it is secured to the sides of the pan. The guides are secured with their forward ends located at a point just below the top of the front end 7 of the pan, and are inclined downward to a point a little the other side of the center of the sides, at which point they are curved upward, as shown at 8, 8, to form bail-stops, the slits 5, 5, allowing this to be accomplished.

In each side 2, 2, of the pan, at and within the curve of the bend, is formed an aperture 9. These apertures 9, 9, are, preferably, located in the center of their respective sides 2, 2, and have the edges of the surrounding metal forced outwardly as shown at 10, 10, for a purpose to be hereinafter described.

Adapted to coöperate with the ash-pan is a bail 11. The bail comprises two spaced, parallel spring-metal arms 12, 12, which are bent inwardly at their forward ends to form a grip portion 13 by which the arms may be compressed laterally. The extreme forward ends of the bail are bent outwardly and connected together by a bolt 14, which is encircled by a grip 15 of the spiral metal type. The other or lower ends of the arms 12, 12, are bent outwardly at right angles to form extensions 16, 16, the ends of which are provided with knobs or enlargements 17, 17.

The bail is used as follows: When it is desired to remove the ash-pan the door of the ash-pit is opened and the bail is taken by the grip portion 13, and compressed, whereby the arms 12, 12, carrying the extensions 16, 16, with the knobs or enlargements 17, 17, will be forced inwardly. Then by placing the knobs 17, 17, on the inside of the sides 2, 2, of the pan and on top of the guides all that it is necessary to do is to force the bail forward and downwardly and the knobs will slide along the sides on top of the guides until the knobs strike the upturned portions or stops of the guides and the depressions surrounding the apertures 9, 9, when the spring of the arms will cause them to project through the apertures, when by pulling outwardly on the bail by the grips 15 the ash-pan will be withdrawn from the ash-pit, and when the pan has been drawn out the bail will assume a position perpendicular to the bottom of the pan, which can be carried to the point where it is desired to dump the contents and can then be pushed back into place by the bail, which can then be removed by compressing the spring arms. The bail is then put to one side for future use.

As is well known with stoves and heaters in which ash-pans are employed, the pans become very hot and hence their removal is rendered troublesome, and gloves or some protection for the hands must be used when the pan is removed. My bail being removable is always cool, whereas if it were a permanent fixture of the ash-pan it would be just as highly heated as the pan, and hence too hot to be handled without difficulty.

What I claim is:

1. An ash pan comprising sides provided with inclined guideways arranged upon the inner surface thereof, and in opposite relation to each other, each of said guideways having an upturned portion, said ash pan being provided with an aperture, located in operative relation to each of said upturned portions, said ash pan having a depression formed around each of said apertures upon the inside thereof, and a bail comprising spring arms, the ends of said arms being bent outwardly to engage said apertures.

2. An ashpan comprising sides provided with inclined guideways arranged upon the inner surface thereof, said guideways having their lower ends turned upwardly, said ash pan being provided with apertures forced outwardly through the sides thereof, said apertures being located adjacent to the upturned portions of said guideways, and a bail comprising spring arms, the front ends being bent inwardly to form a grip portion, the other end of said arms being bent outwardly to form extensions to removably engage said apertures.

3. In a device of the character described, the combination with a receptacle, of guide-members secured to the inner face of said receptacle, said guide-members provided with a guiding flange and with an end-stop, said receptacle provided with a receiving-socket or aperture contiguous to the end-stop of each guide-member, and detachable lifting means adapted to be guided into said sockets and normally retained therein.

4. An ashpan of the character described comprising sides provided with outstanding guideways, each of said guideways having a bent portion, each of said sides being provided with an aperture in operative relation with said guideways, a bail adapted to run along said guideways, and provided with bent portions, said bent portions of said guideways being adapted to direct said bent portions of said bail into said apertures.

5. An ashpan of the character described, comprising sides provided with outstanding guideways, each of said guideways having a bent portion, each of said sides being provided with an aperture in operative relation with said outstanding guideways, a bail provided with bent portions adapted to travel along said guideways and to be guided thereby into said apertures, said bail being normally removable from said guideways by an upward movement.

In testimony whereof I hereunto affix my signature in presence of two witnesses.

OTTO J. MORTENSON.

Witnesses:
R. B. CHAPPELL,
JEROME WOLFE.